(12) United States Patent
Choe et al.

(10) Patent No.: US 10,849,128 B2
(45) Date of Patent: Nov. 24, 2020

(54) APPARATUS AND METHOD FOR TRANSMITTING SIGNALS USING BEAM IN WIRELESS COMMUNICATION SYSTEM

(71) Applicant: SAMSUNG ELECTRONICS CO., LTD., Suwon-si (KR)

(72) Inventors: Balg Eum Choe, Suwon-si (KR); Hyo Yol Park, Suwon-si (KR); Keun Chul Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 16/212,949

(22) Filed: Dec. 7, 2018

(65) Prior Publication Data

US 2019/0182816 A1    Jun. 13, 2019

(30) Foreign Application Priority Data

Dec. 7, 2017    (KR) .................. 10-2017-0167491

(51) Int. Cl.
*H04W 56/00* (2009.01)
*H04W 72/04* (2009.01)
(Continued)

(52) U.S. Cl.
CPC ........ *H04W 72/046* (2013.01); *H04B 7/0695* (2013.01); *H04L 1/0003* (2013.01);
(Continued)

(58) Field of Classification Search
CPC . H04W 72/046; H04W 24/08; H04W 72/085; H04W 72/10; H04B 7/0695; H04B 7/063; H04B 7/0632; H04L 1/0003
(Continued)

(56) References Cited

U.S. PATENT DOCUMENTS

| 5,987,020 A * | 11/1999 | Abe ...................... H04L 1/0045 370/345 |
| 2011/0122894 A1* | 5/2011 | Gobara ................... G01S 19/29 370/479 |

(Continued)

FOREIGN PATENT DOCUMENTS

WO    2016/204365 A1    12/2016

OTHER PUBLICATIONS

Communication dated Apr. 11, 2019, issued by the European Patent Office in counterpart European Patent Application No. 18210903.3.
(Continued)

*Primary Examiner* — Sai Ming Chan
(74) *Attorney, Agent, or Firm* — Sughrue Mion, PLLC

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). There is provided a method for operating a base station in a wireless communication system including receiving first feedback information indicating a first preferred beam from a first terminal and second feedback information indicating a second preferred beam from a second terminal, allocating to the second terminal the first preferred beam as a non-preferred beam of the second terminal, and transmitting first data to the first terminal and second data to the second terminal using the first preferred beam as a preferred beam of the first terminal and the non-preferred beam of the second terminal.

20 Claims, 18 Drawing Sheets

(51) Int. Cl.
  *H04W 72/08*  (2009.01)
  *H04W 72/10*  (2009.01)
  *H04W 24/08*  (2009.01)
  *H04L 1/00*   (2006.01)
  *H04B 7/06*   (2006.01)

(52) U.S. Cl.
  CPC ......... *H04W 24/08* (2013.01); *H04W 72/085* (2013.01); *H04W 72/10* (2013.01); *H04B 7/063* (2013.01); *H04B 7/0632* (2013.01)

(58) Field of Classification Search
  USPC ........................................................ 370/329
  See application file for complete search history.

(56) References Cited

U.S. PATENT DOCUMENTS

| | | | |
|---|---|---|---|
| 2012/0027111 A1* | 2/2012 | Vook ................ | H04B 7/0452 375/267 |
| 2013/0059619 A1* | 3/2013 | Kim ................. | H04W 72/046 455/509 |
| 2014/0071841 A1* | 3/2014 | Hu ................... | H04L 5/0035 370/252 |
| 2016/0044517 A1 | 2/2016 | Raghavan et al. | |
| 2016/0267783 A1* | 9/2016 | Shearer ............ | G08C 19/28 |
| 2018/0183505 A1* | 6/2018 | Kim ................. | H04B 7/0695 |

OTHER PUBLICATIONS

Communication dated Apr. 17, 2020 issued by the European Patent Office in application No. 18210903.3.

* cited by examiner

APPARATUS AND METHOD FOR TRANSMITTING SIGNALS USING BEAM IN WIRELESS COMMUNICATION SYSTEM

CROSS-REFERENCE TO RELATED APPLICATION(S)

This application is based on and claims priority under 35 U.S.C. § 119 from Korean Patent Application No. 10-2017-0167491, filed on Dec. 7, 2017, in the Korean Intellectual Property Office, the disclosure of which is incorporated by reference herein in its entirety.

1. FIELD

The disclosure generally relates to a wireless communication system. More particularly, the disclosure relates to an apparatus and a method for transmitting signals using a beam in the wireless communication system.

2. DESCRIPTION OF RELATED ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addcition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed Due to lack of available frequency resources in a frequency band (e.g., 2 to 5 GHz) used in a conventional communication system, a system of the extremely high frequency band (e.g., over 30 GHz or so) is standardized as a 5G new radio (NR). Because a signal wave length of the extremely high frequency band is below 10 mm, the extremely high frequency band is referred as mmWave frequency band. A prominent characteristic or feature of the extremely high frequency band is that a propagation loss based on distance increases as the frequency rises, compared with a low frequency band. By contrast, because the wave length is also reduced, the propagation loss may be overcome by applying a beamforming technique using a high-gain analog directional antenna with multiple antennas. Hence, a beamforming design using the multiple antennas would be desirable in the mmWave frequency band.

SUMMARY

In view of the above, an aspect of the disclosure is to provide an apparatus and a method for effectively transmitting signals using a beam in a wireless communication system.

Another aspect of the disclosure is to provide an apparatus and a method for allocating resources by considering a preferred beam of terminals in a wireless communication system.

Yet another aspect of the disclosure is to provide an apparatus and a method for transmitting signals using a non-preferred beam in a wireless communication system.

Still another aspect of the disclosure is to provide an apparatus and a method for compensating for electric field reduction according to use of a non-preferred beam in a wireless communication system.

In accordance with an embodiment of the disclosure, there is provided a method for operating a base station in a wireless communication system including receiving first feedback information indicating a first preferred beam from a first terminal and second feedback information indicating a second preferred beam from a second terminal, allocating to the second terminal the first preferred beam as a non-preferred beam of the second terminal, and transmitting first data to the first terminal and second data to the second terminal using the first preferred beam as a preferred beam of the first terminal and the non-preferred beam of the second terminal.

In accordance with an embodiment of the disclosure, there is provided a base station in a wireless communication system including a transceiver configured to transmit signals to and receive signals from a first terminal and a second terminal and at least one processor. The at least one processor may be configured to receive via the transceiver from the first terminal first feedback information indicating a first preferred beam and via the transceiver from a second terminal second feedback information indicating a second preferred beam, allocate to the second terminal the first preferred beam as a non-preferred beam of the second terminal, and control to transmit via the transceiver first data to the first terminal and second data to the second terminal using the first preferred beam as a preferred beam of the first terminal and the non-preferred beam of the second terminal.

In accordance with an embodiment of the disclosure, there is provided a terminal in a wireless communication system including a transceiver and at least one processor. The at least one processor may be configured to transmit via the transceiver to a base station feedback information indicating a first beam as a preferred beam, and to receive data transmitted using a second beam different from the first beam.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION OF EMBODIMENTS

Terms employed in the disclosure are for describing particular embodiments and are not intended to limit the scope of other embodiments. A singular form may include a plurality of forms unless it is explicitly differently represented. All the terms used herein, including technical and scientific terms, may have the same meanings as terms that are generally understood by those skilled in the art to which the disclosure pertains. Among terms used in the disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure the terms should not be interpreted to exclude the embodiments of the disclosure. Expressions such as "at least one of," when preceding a list of elements, modify the entire list of elements and do not modify the individual elements of the list. For example, the expressions "at least one of a, b, and c," "at least one of a, b, and c," "at least one of a, b, and/or c," and "at least one of a, b, or c" should be understood as including only a, only b, only c, both a and b, both a and c, both b and c, or all of a, b, and c.

In various embodiments of the disclosure described below, a hardware approach will be described as an example. However, as the various embodiments of the disclosure include technology employing both hardware and software, the various embodiments of the disclosure do not exclude a software-based approach or an approach implemented by a combined hardware and software approach.

The disclosure provides an apparatus and a method for transmitting signals using a beam in a wireless communication system. More specifically, the disclosure provides a scheduling technique usable in a wireless communication system that supports beamforming.

Terms indicating signals, terms indicating channel properties (e.g., field strength, channel quality, gain), terms indicating control information, terms indicating network entities, and terms indicating components of a device, which are used in the following descriptions, are for the sake of explanations. Accordingly, the disclosure is not limited to the terms to be described, and may use other terms having technically similar meanings.

The disclosure provides various embodiments with terms used in some communication standards (e.g., 3rd Generation Partnership Project (3GPP)) by way of example. Various embodiments of the disclosure may be applied for use in other types of communication systems (e.g., 4G, 5G, etc.).

Figure 1:
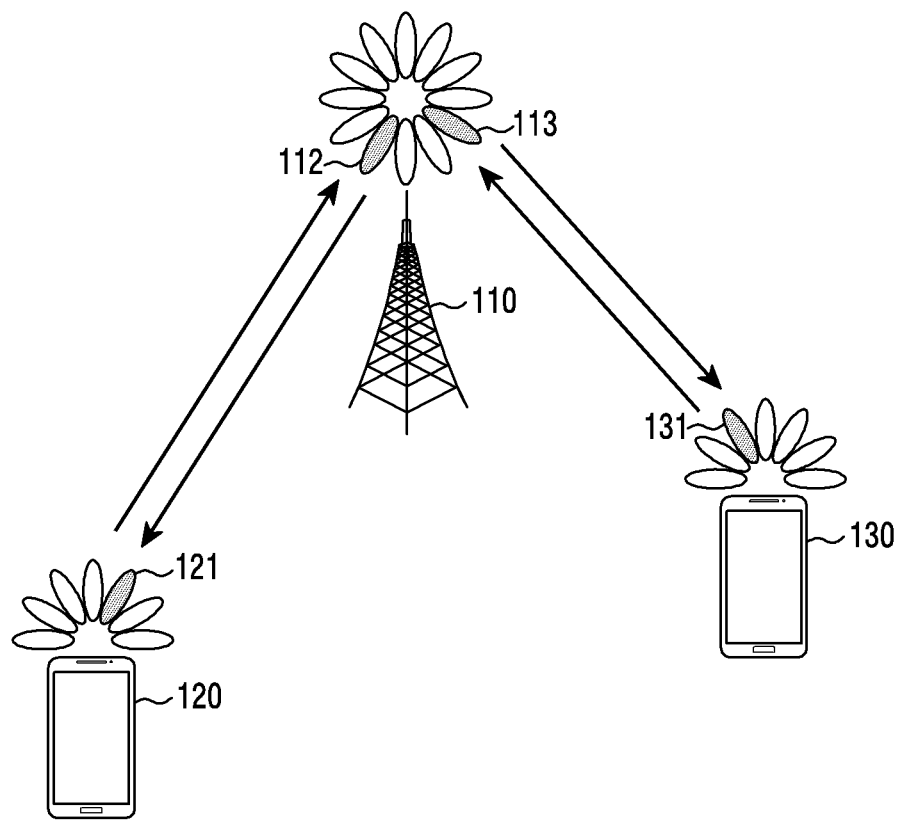
FIG. 1 illustrates a wireless communication system according to an embodiment of the disclosure.

FIG. 1 illustrates a wireless communication system according to an embodiment of the disclosure. In the wireless communication system, FIG. 1 depicts a base station 110, a terminal 120, and a terminal 130, as some of nodes that communicate via a radio channel in the wireless communication system. While FIG. 1 depicts the single base station 110 alone, additional base stations may be further included. Similarly, while FIG. 1 depicts only terminals 120, 130, additional terminals may be further included. As apparent, additional components of the wireless communication system may also be included.

The base station 110 is primary network infrastructure of the wireless communication system that provides a radio access to the terminals 120 and 130. The base station 110 has a coverage range or area defined as a geographical area or reach, based on a signal transmission distance of the base station 110 and a reception ability of the terminals 120, 130. The base station 110 may be referred to as an access point (AP), an eNodeB (eNB), a 5th generation node (5G node), a 5G node B (5gNB), a wireless point, a transmission/reception point (TRP), or other term having a similar technical meaning.

The terminal 120 and the terminal 130 are generally used by a user and communicate with the base station 110 and/or other terminals over a radio channel. In some cases, at least one of the terminal 120 and the terminal 130 may operate without user's involvement. That is, at least one of the terminal 120 and the terminal 130 performs machine type communication (MTC) and may not be actively operated by the user. The terminal 120 and the terminal 130 each may be referred to as a user equipment (UE), a mobile station, a subscriber station, a remote terminal, a wireless terminal, a user device, or other term having a similar technical meaning.

The base station 110, the terminal 120, and the terminal 130 may transmit and receive radio signals using a millimeter wave (mmWave) band (e.g., 28 GHz, 30 GHz, 38 GHz, 60 GHz). To improve channel gain, the base station 110, the terminal 120, and the terminal 130 may conduct beamforming. Herein, beamforming includes transmit beamforming and receive beamforming. That is, the base station 110, the terminal 120, and the terminal 130 may apply directivity to a transmit signal or a receive signal. In doing so, the base station 110 and the terminals 120 and 130 may select serving beams 112, 113, 121, and 131 through beam search or beam management. After the serving beams 112, 113, 121, and 131 are selected, communications may be performed using resources quasi co-located (QCL) with resources carrying the serving beams 112, 113, 121, and 131.

If large-scale properties of a channel, which carries a symbol on a first antenna port, may be inferred from another channel, which carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

Figure 2:
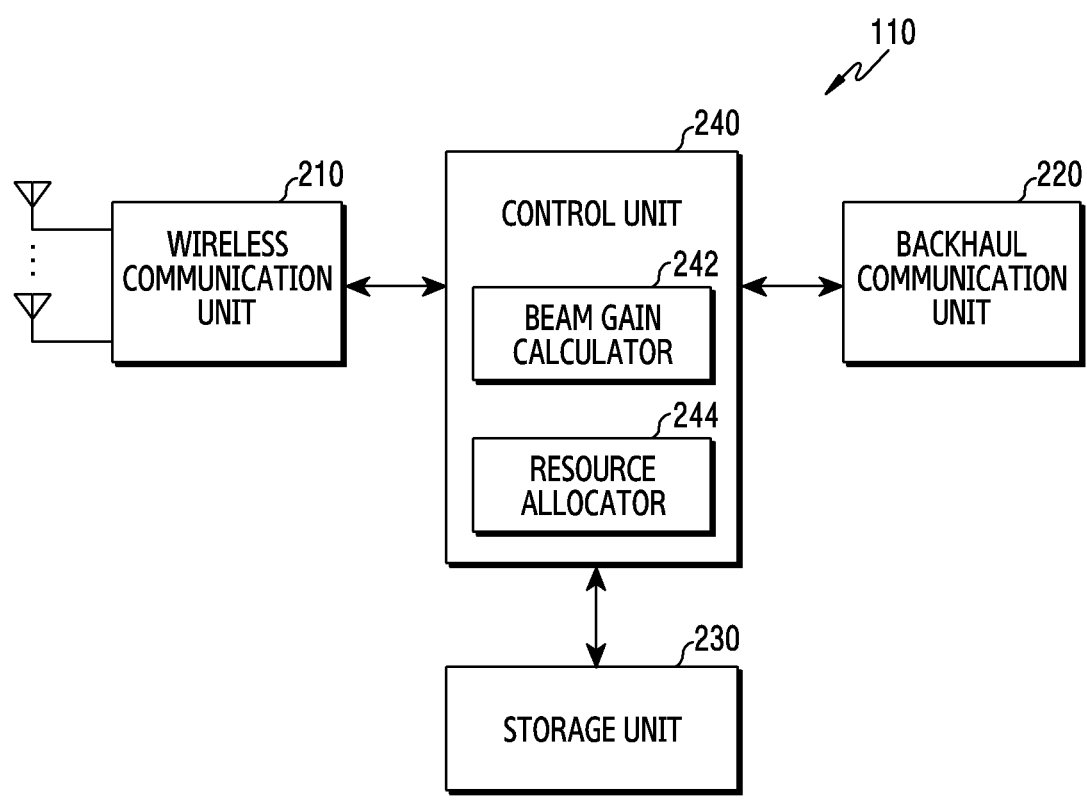
FIG. 2 illustrates a base station in a wireless communication system according to an embodiment of the disclosure.

FIG. 2 illustrates a base station in a wireless communication system according to an embodiment of the disclosure. FIG. 2 depicts a configuration of the base station 110. A term such as 'portion' or '~er' indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may transmit and receive signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits the RF band signal via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and the like. In addition, the wireless communication unit 210 may include a plurality of transmit and receive paths. Further, the wireless communication unit 210 may include at least one antenna array including a plurality of antenna or antenna elements.

In view of hardware, the wireless communication unit 210 may further include a digital unit and an analog unit, and the analog unit may include a plurality of sub-units according to an operating power and an operating frequency. The digital unit may include at least one processor (e.g., a digital signal processor (DSP)).

As such, the wireless communication unit 210 transmits and receives signals. Hence, a whole or part of the wireless communication unit 210 may be referred to as a transmitter, a receiver, or a transceiver. In the following, the transmission and the reception over the radio channel embrace the above-described processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for controlling or operating the base station, an application program, and data, such as setting information. The storage unit 230 may include a volatile memory, a non-volatile memory, or a combination of a volatile memory and a non-volatile memory. The storage unit 230 provides the stored data in response to a request of the control unit 240 (i.e., data read) and stores data thereto in response to a request of the control unit 240 (i.e., data store).

The control unit 240 controls general operations of the base station. For example, the control unit 240 transmits and receives signals through the wireless communication unit 210 or the backhaul communication unit 220. Also, the control unit 240 records data to and reads data from the storage unit 230. The control unit 240 may execute functions of a protocol stack according to one or more a communication standards. According to an embodiment, the protocol stack may be included in the wireless communication unit 210. The control unit 240 may include at least one processor (controller, hardware microcontroller, hardware microprocessor, hardware central processing unit, etc.).

According to an embodiment, the control unit 240 may include a beam gain calculator 242 and a resource allocator 244. The beam gain calculator 242 calculates a channel gain decrease value when a resource is allocated to a terminal, which selects an analog beam as a preferred beam. Since the analog beam radiates signals with constant power besides directions of the beams, data destined for a particular terminal may be transmitted using a beam heading to another terminal. Yet, to select an adequate coding and modulation order, an accurate channel quality is expected when the data is transmitted using a beam other than the preferred beam. In general, since the analog beam uses a preset phase shift value, the base station knows forms of the beams and the channel quality value, which reduces as the beam other than the preferred beam is used, may be obtained in advance. The resource allocator 244 determines whether to allocate a resource to a terminal, which is served using a beam other than the preferred beam.

Herein, the beam gain calculator 242 and the resource allocator 244 may be implemented as an instruction set or computer-readable and executable code stored in the storage unit 230, a memory storing the instructions/code residing in the control unit 240, or part of circuitry of the control unit 240.

According to an embodiment, the control unit 240 may control the base station 110 to transmit data to the terminal using a beam other than the preferred beam, which is fed back from the terminal. In so doing, the modulation order or the code rate for the data may be determined based on a radiation pattern of a first beam and a radiation pattern of a second beam. For example, the control unit 240 may control the base station to carry out operations to be explained according to embodiments below.

Figure 3:
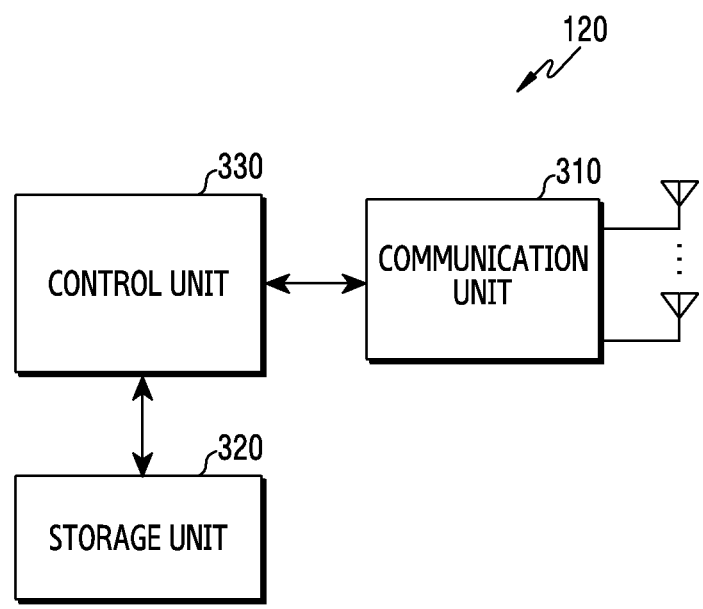
FIG. 3 illustrates a terminal in a wireless communication system according to an embodiment of the disclosure.

FIG. 3 illustrates a terminal in a wireless communication system according to an embodiment of the disclosure. FIG. 3 depicts a configuration of the terminal 120. A term such as 'portion' or er' indicates a unit for processing at least one function or operation, and may be implemented using hardware, software, or a combination of hardware and software.

Referring to FIG. 3, the terminal includes a communication unit 310, a storage unit 320, and a control unit 330.

The communication unit 310 may transmit and receive signals over a radio channel. For example, the communication unit 310 performs a conversion function between a baseband signal and a bit string according to a physical layer standard of the wireless communication system. For example, for data transmission, the communication unit 310 generates complex symbols by encoding and modulating a transmit bit string. Also, for data reception, the communication unit 310 restores a receive bit string by demodulating and decoding a baseband signal. Also, the communication unit 310 up-converts the baseband signal to an RF band signal, transmits the RF band signal via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. The communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As such, the communication unit 310 transmits and receives signals. Hence, a whole or part of the communication unit 310 may be referred to as a transmitter, a receiver, or a transceiver. Hereafter, the transmission and the reception over the radio channel embrace the above-described processing of the communication unit 310.

The storage unit 320 stores a basic program for operating the terminal, an application program, and data, such as setting information. The storage unit 320 may include a volatile memory, a non-volatile memory, or a combination of a volatile memory and a non-volatile memory. The storage unit 320 provides the stored data according to a request of the control unit 330 (i.e., data read) or stores data thereto in response to a request of the control unit 300 (i.e., data write).

The control unit 330 controls general operations of the terminal. For example, the control unit 330 transmits and receives signals through the communication unit 310. Also, the control unit 330 records data to and reads from the storage unit 320. The control unit 330 may execute functions of a protocol stack implemented by a communication standard. For doing so, the control unit 330 may include at least one processor or microprocessor, or may be part of a processor. Part of the communication unit 310 and the control unit 330 may be referred to as a communication processor (CP).

According to an embodiment, the control unit 330 may control to receive data using a beam other than a preferred beam that is fed back to the base station. In so doing, the modulation order or the code rate for the data may be determined based on the radiation pattern of a first beam and the radiation pattern of a second beam. For example, the control unit 330 may control the terminal to carry out operations to be explained below, according to various embodiments.

The base station or the terminal as described in FIG. 2 and FIG. 3 may perform beamforming. In analog beamforming for downlink communication, the base station may artificially control the direction by regulating a phase of multiple antenna elements. The phase value based on an intended direction is pre-stored, and the base station may generate a beam by applying adequate phase values to the antenna elements according to the intended direction. If the analog beam is selected, the base station allocates resources to terminals to which the selected beam directs. A specific structure for the beamforming is described in detail by referring to FIGS. 4A, 4B, and 4C.

Figure 4A:
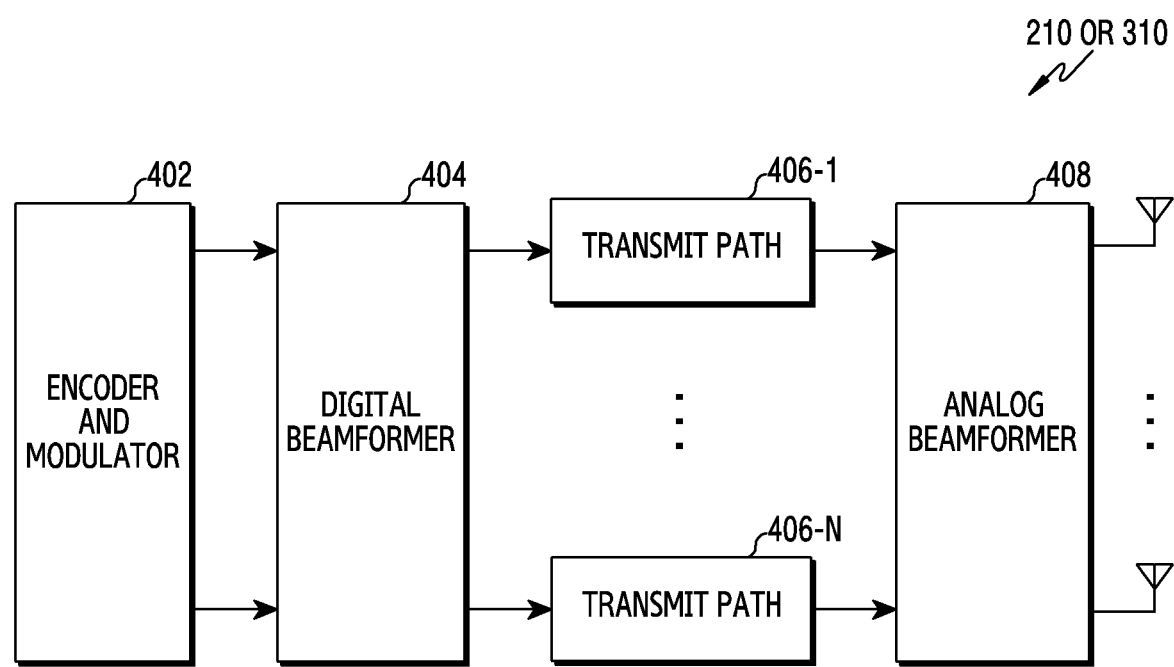
FIGS. 4A, 4B, and 4C illustrate a communication unit in a wireless communication system according to an embodiment of the disclosure.
Figure 4B:
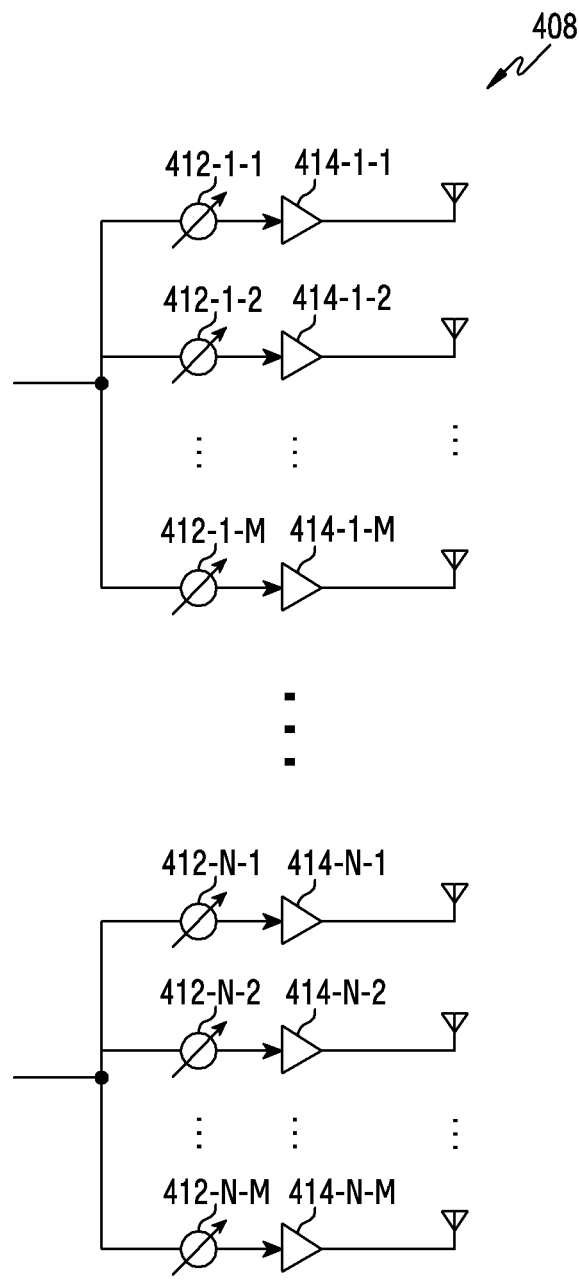
Figure 4C:
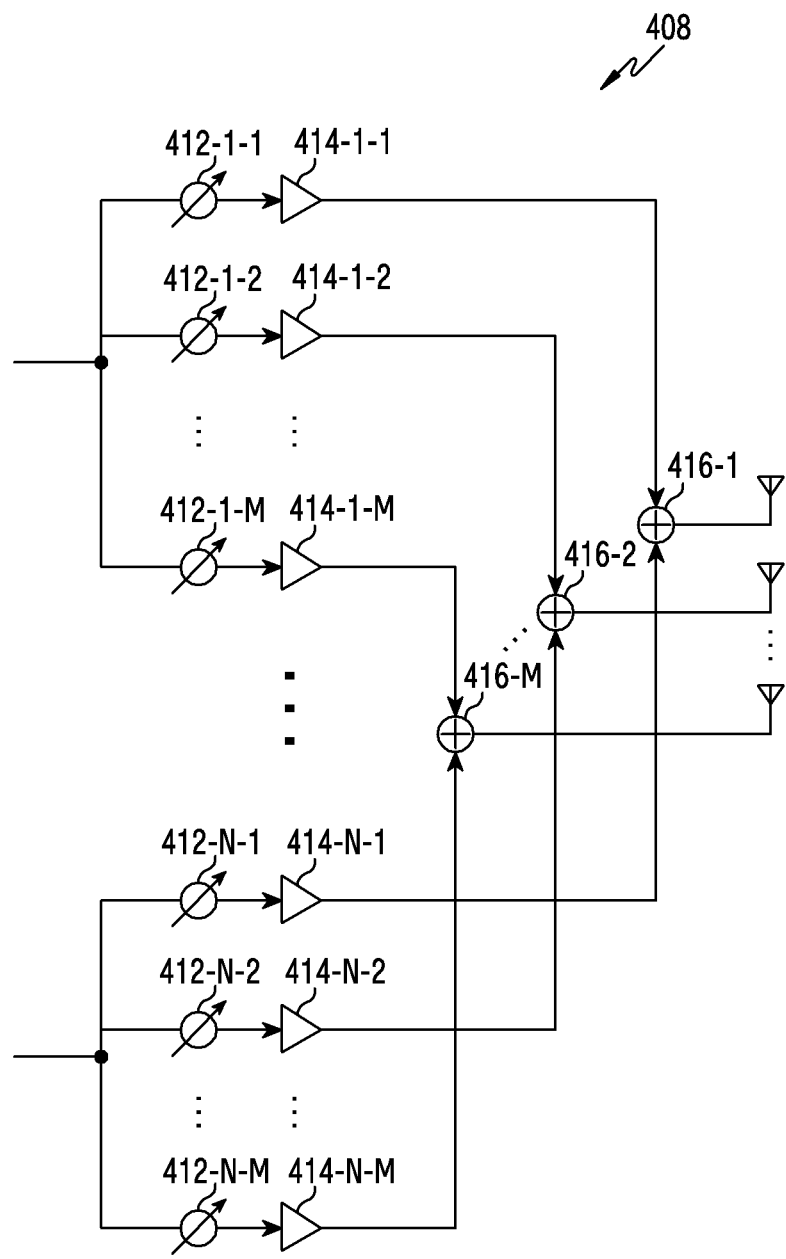

FIGS. 4A, 4B, and 4C illustrate a communication unit in a wireless communication system according to an embodiment of the disclosure. FIGS. 4A, 4B, and 4C depict a detailed configuration of the wireless communication unit 210 of FIG. 2 or the communication unit 310 of FIG. 3. More specifically, FIGS. 4A, 4B, and 4C depict components, as part of the wireless communication unit 210 of FIG. 2 or the communication unit 310 of FIG. 3, for performing the beamforming.

Referring to FIG. 4, the wireless communication unit 210 or the communication unit 310 includes an encoder and modulator 402, a digital beamformer 404, a plurality of transmit paths 406-1 through 406-N, and an analog beamformer 408.

The encoder and modulator 402 performs channel encoding. For the channel encoding, at least one of low density parity check (LDPC) code, convolution code, and polar code may be used. The encoder and modulator 402 generates modulation symbols through constellation mapping.

The digital beamformer 404 beamforms a digital signal (e.g., the modulation symbols). For doing so, the digital beamformer 404 multiplies the modulation symbols by beamforming weights. Herein, the beamforming weights are used to adjust a level and a phase of a signal and may be referred to as a precoding matrix or a precoder. The digital beamformer 404 outputs the digital-beamformed modulation symbols to the plurality of transmit paths 406-1 through 406-N. In so doing, according to multiple input multiple output (MIMO) transmission, the modulation symbols may be multiplexed or the same modulation symbols may be fed to the plurality of transmit paths 406-1 through 406-N.

The plurality of the transmit paths 406-1 through 406-N converts the digital-beamformed digital signals to analog signals. For doing so, the plurality of the transmit paths 406-1 through 406-N each may include an inverse fast Fourier transform (IFFT) operator, a CP adder, a DAC, and an up-converter. The CP adder is used for orthogonal frequency division multiplexing (OFDM), and may be excluded if another physical layer scheme (e.g., filter bank multi-carrier (FBMC)) is applied. That is, the plurality of transmit paths 406-1 through 406-N provides an independent signal process for a plurality of streams generated through the digital beamforming. Notably, depending on the implementation, some of the components of the transmit paths 406-1 through 406-N may be used in common.

The analog beamformer 408 beamforms the analog signals. For doing so, the analog beamformer 408 multiplies the analog signals by the beamforming weights. Herein, the beamforming weights are used to adjust the level and the phase of the signal. More specifically, the analog beamformer 408 may be configured as shown in FIG. 4B or FIG. 4C, according to a connection structure between the transmit paths 406-1 through 406-N and the antennas.

Referring to FIG. 4B, signals input to the analog beamformer 408 are converted in phase and/or magnitude, amplified, and then transmitted via the antennas. In so doing, signals of each path are transmitted via different antenna sets, that is, antenna arrays. A signal input in a first path is converted by phase/magnitude converters 412-1-1 through 412-1-M to a signal string having different or the same phase and/or magnitude, amplified by amplifiers 414-1-1 through 414-1-M, and then transmitted via the antennas.

Referring to FIG. 4C, signals input to the analog beamformer 408 are converted in phase and/or magnitude, amplified, and then transmitted via antennas. In so doing, signals of each path are transmitted via the same antenna set, that is, antenna array. A signal input in the first path is converted by the phase and/or magnitude converters 412-1-1 through 412-1-M to a signal string having different or the same phase and/or magnitude, and amplified by the amplifiers 414-1-1 through 414-1-M. Next, to transmit via a single antenna array, the amplified signals are summed by adders 416-1-1 through 416-1-M based on the antenna element and then transmitted via the antennas.

The independent antenna array is used per transmit path in FIG. 4B, and the transmit paths share the single antenna array in FIG. 4C. However, according to another embodiment, some transmit paths may use the independent antenna array, and the rest transmit paths may share one antenna array. Further, according to yet another embodiment, by applying a switchable structure between the transmit paths and the antenna arrays, a structure for adaptively adjusting the magnitude and/or phase may be used according to a situation.

The base station may form the analog beam using a plurality of antenna elements to expand a service area in the mmWave band. In so doing, signals are radiated with low power in directions other than a main direction of the analog beams. As mentioned in FIG. 4A, the analog beamforming is performed on the signal after the IFFT operation. That is, because the analog beam is formed in the time domain, signals transmitted over resources of the same time unit (e.g., transmit time interval (TTI), slot, subframe) are transmitted over one analog beam. In an actual communication environment, a plurality of terminals is distributed at several locations and accordingly preferred beams of the terminals may be different from each other. The resource allocation in consideration of the preferred beam is now explained in FIG. 5A and FIG. 5B.

Figure 5A:
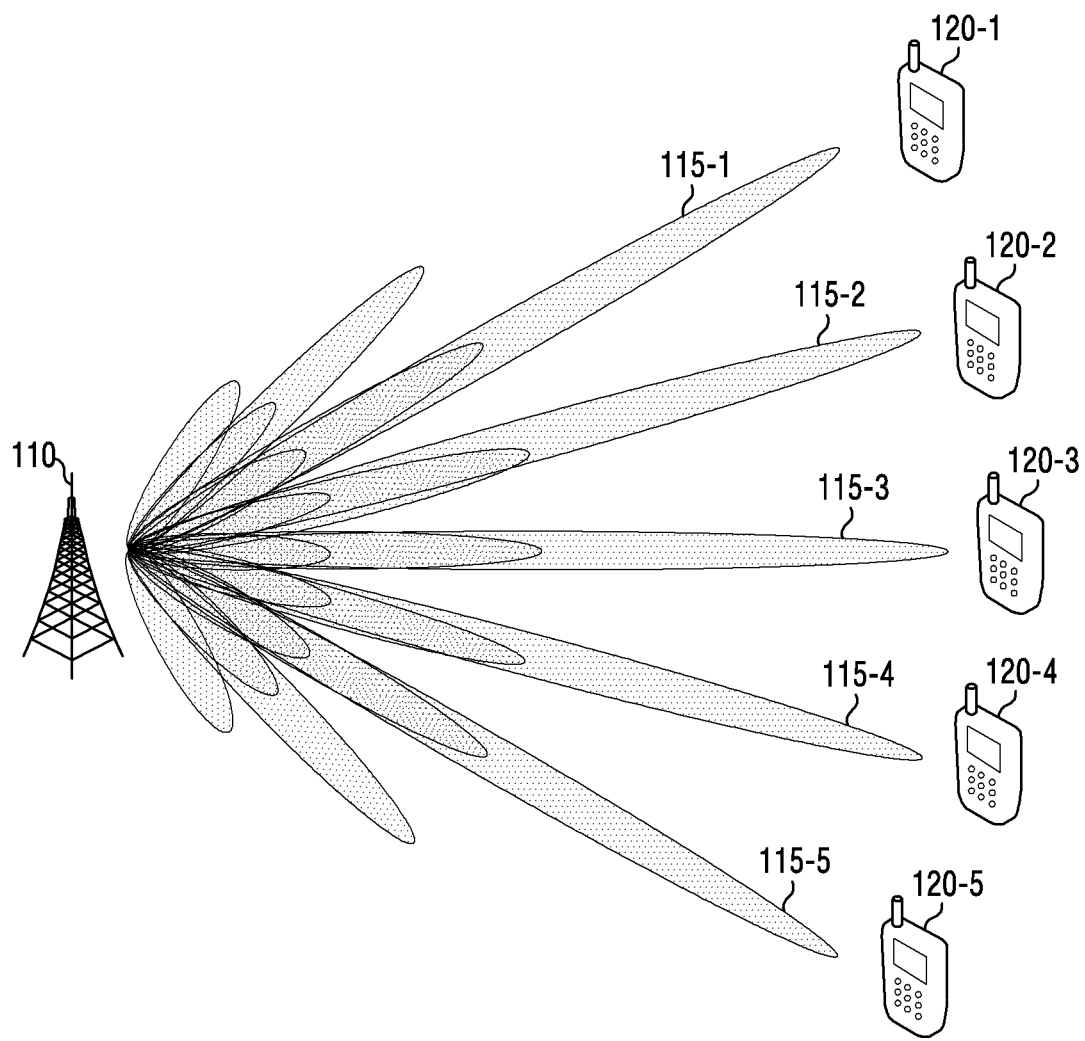
FIGS. 5A and 5B illustrate resource allocation in consideration of a preferred beam in a wireless communication system according to an embodiment of the disclosure.
Figure 5B:
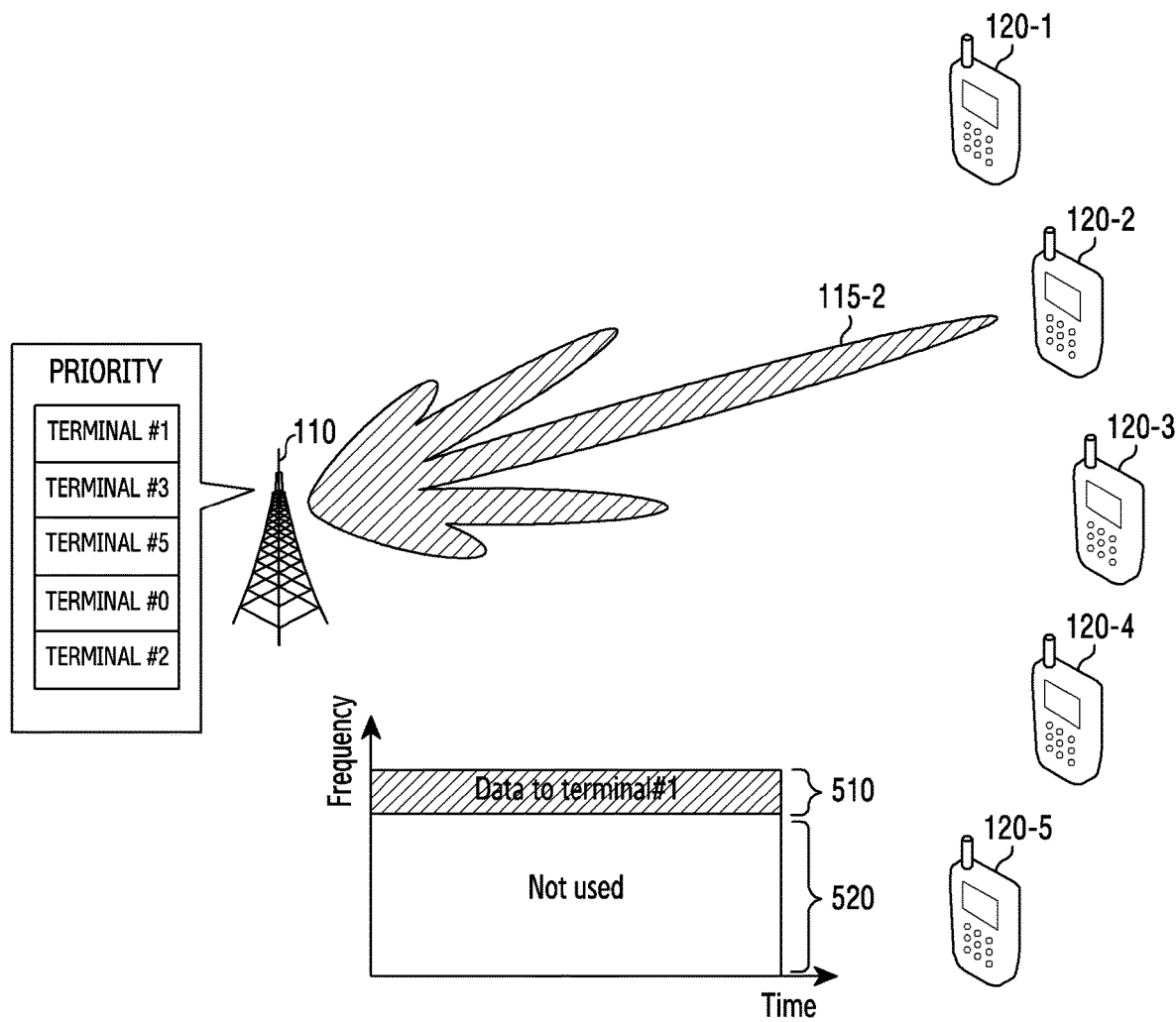

FIGS. 5A and 5B illustrate resource allocation in consideration of a preferred beam in a wireless communication system according to an embodiment of the disclosure.

Referring to FIG. 5A, terminals 120-1 through 120-5 are connected to a base station 110. Through beam management, preferred beams of the terminals 120-1 through 120-5 are determined. For example, the preferred beam of the terminal 120-1 is a beam #0 115-1, the preferred beam of the terminal 120-2 is a beam #1 115-2, the preferred beam of the terminal 120-3 is a beam #2 115-3, the preferred beam of the terminal 120-4 is a beam #3 115-4, and the preferred beam of the terminal 120-5 is a beam #4 115-5.

To allocate the preferred beams to all of the terminals 120-1 through 120-5, if one analog beam is selected, a resource may be allocated to only one terminal in a corresponding time interval. In other words, no resources may be allocated to the terminals that do not determine the beam selected as the preferred beam in the corresponding time interval. Referring to FIG. 5B, the resource is allocated first to the terminal 120-2 having the highest scheduling metric. Accordingly, the beam #1 115-2, which is the preferred beam of the terminal 120-2, is used in the corresponding time interval. However, only part 510 of the resource of the data destined from the terminal 120-2 in the corresponding time interval is used. According to the rule of transmitting a signal over a preferred beam, if a plurality of analog beams is not formed in the frequency axis, the unused portion 520 of the resource may not be allocated to other terminals.

That is, if each terminal has considerable traffic to transmit, no resources may be wasted as shown in FIG. 5B. However, in general, because information of a small data size, such as a signaling message, a random access message, a transmission control protocol (TCP)/radio link control (RLC) acknowledge (ACK)/negative ACK (HACK), require relatively fast processing, traffic of a small data size may have a high priority. In this case, if there is no other terminal in the beam direction of the first selected terminal, or if a frequency resource allocated to other terminal, if any, may not fill available frequency resources, the resources may be wasted as shown in FIG. 5B.

Hence, the disclosure provides various embodiments for reducing frequency resources wasted by allocating a resource to a terminal of a different beam direction, and improving system performance in the extremely high frequency band system that uses the analog beam.

Figure 6:
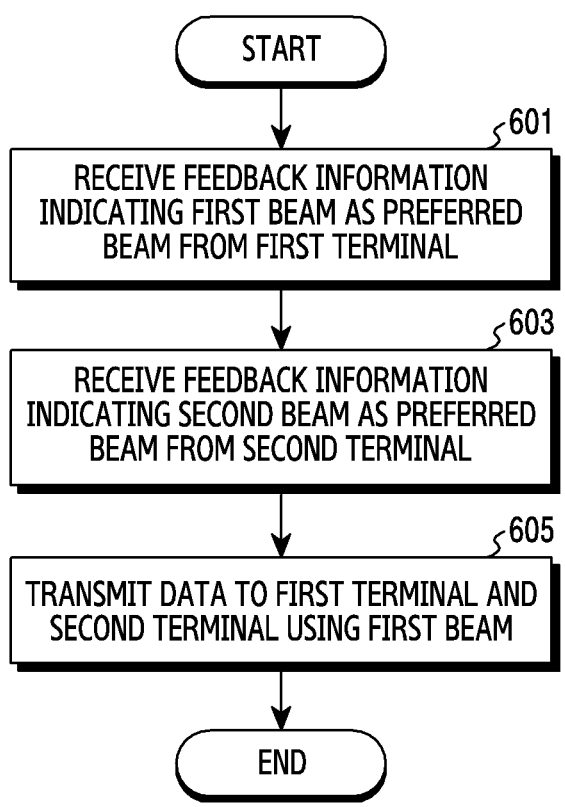
FIG. 6 illustrates a flowchart of a method of transmitting data in a wireless communication system according to an embodiment of the disclosure.

FIG. 6 illustrates a flowchart of a base station in a wireless communication system according to various embodiments of the disclosure. FIG. 6 illustrates an operating method of the base station 110.

Referring to FIG. 6, in operation 601, the base station receives feedback information, which indicates a first beam as a preferred beam, from a first terminal. For doing so, the base station may transmit a signal (e.g., sync signal, reference signal, etc.) for signal measurement over a plurality of transmit beams. The feedback information includes identification information for at least one beam. Herein, the beam identification information may include information (e.g., symbol index, block index, etc.) for indicating a resource that carries the measurement signal or information for indicating the measurement signal.

In operation 603, the base station receives feedback information, which indicates a second beam as a preferred beam, from a second terminal. For doing so, the base station may transmit a signal (e.g., sync signal, reference signal, etc.) for signal measurement over a plurality of transmit beams. In so doing, the measurement signals may be used in common by both of the first terminal and the second terminal for the measurement, or may be used dedicatedly or solely by the second terminal. The feedback information received from the second terminal indicates the second beam, which is different from the preferred beam of the first terminal, in other words the first beam, as the preferred beam.

In operation 605, the base station transmits data to the first terminal and the second terminal using the first beam. That is, the base station transmits the data destined for the first terminal over the preferred beam that is preferred by the first terminal and the data destined for the second terminal over a non-preferred beam, or in other words a beam that is different from the preferred beam that is preferred by the second terminal. At this time, resources allocated to the first terminal and the second terminal are included in the same time interval. That is, the base station maps the data destined for the first terminal and the data destined for the second terminal to the resources of the time interval, beamforms a signal including the data, and thus transmits the signal over the first beam. In so doing, because the second terminal is not served by the preferred beam that is preferred by the second terminal, the base station applies a modulation order and a code rate determined based on radiation patterns of the first beam and the second beam. Although not depicted in FIG. 6, before the data transmission, the base station may transmit control information (e.g., downlink control information (DCI)) for notifying the determined modulation order and code rate, to the second terminal.

Figure 7:
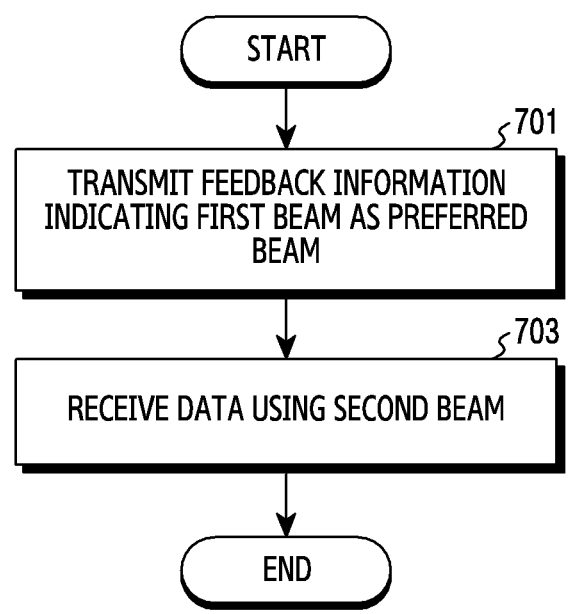
FIG. 7 illustrates a flowchart of a method of transmitting data in a wireless communication system according to an embodiment of the disclosure.

FIG. 7 illustrates a flowchart of a method of transmitting data in a wireless communication system according to an embodiment of the disclosure. FIG. 7 illustrates an operating method of the terminal 120.

Referring to FIG. 7, in operation 701, the terminal transmits feedback information, which indicates a first beam as a preferred beam, to the base station. For doing so, the terminal may measure signals (e.g., sync signal, reference signal, etc.) for measurement transmitted from the base station over a plurality of transmit beams. The feedback information includes identification information for identifying at least one beam, such as an identification of the at least one beam or a code or codes corresponding to the at least one beam. Herein, the beam identification information may include information for indicating a resource that carries the measurement signal or information for indicating the measurement signal.

In operation 703, the terminal receives data using the second beam. That is, the terminal receives the data transmitted over a non-preferred beam (e.g., the second beam), rather than the preferred beam (e.g., the first beam). In general, the terminal may not recognize the data transmission using the second beam if the terminal is configured to receive information using the first beam. Thus, before the data reception, the terminal may receive control information (e.g., DCI) for notifying a modulation order and a code rate determined by the base station based on radiation patterns of the first beam and the second beam.

As stated in FIG. 6 and FIG. 7, the data may be transmitted using the non-preferred beam, rather than the preferred beam. The operating method of the base station of FIG. 6 is now described in further detail.

Figure 8:
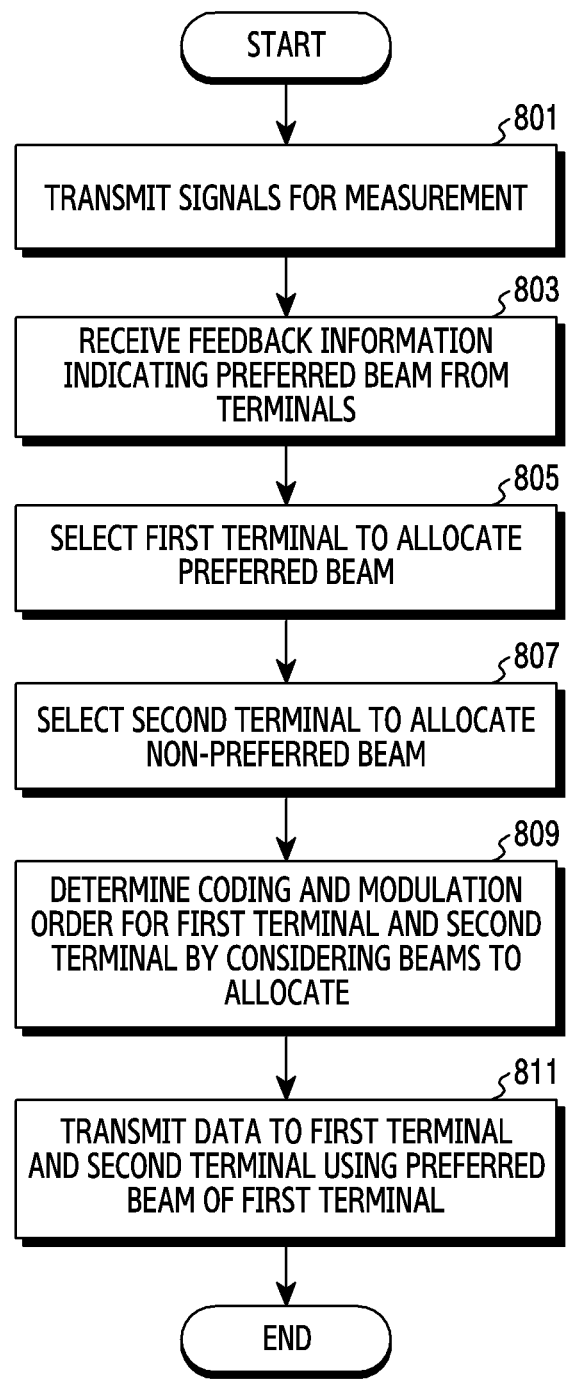
FIG. 8 illustrates a flowchart of a method of transmitting data in a wireless communication system according to an embodiment of the disclosure.

FIG. 8 illustrates a flowchart of a method of transmitting data in a wireless communication system according to an embodiment of the disclosure. FIG. 8 elucidates the operating method of the base station 110 of FIG. 6.

Figure 9:
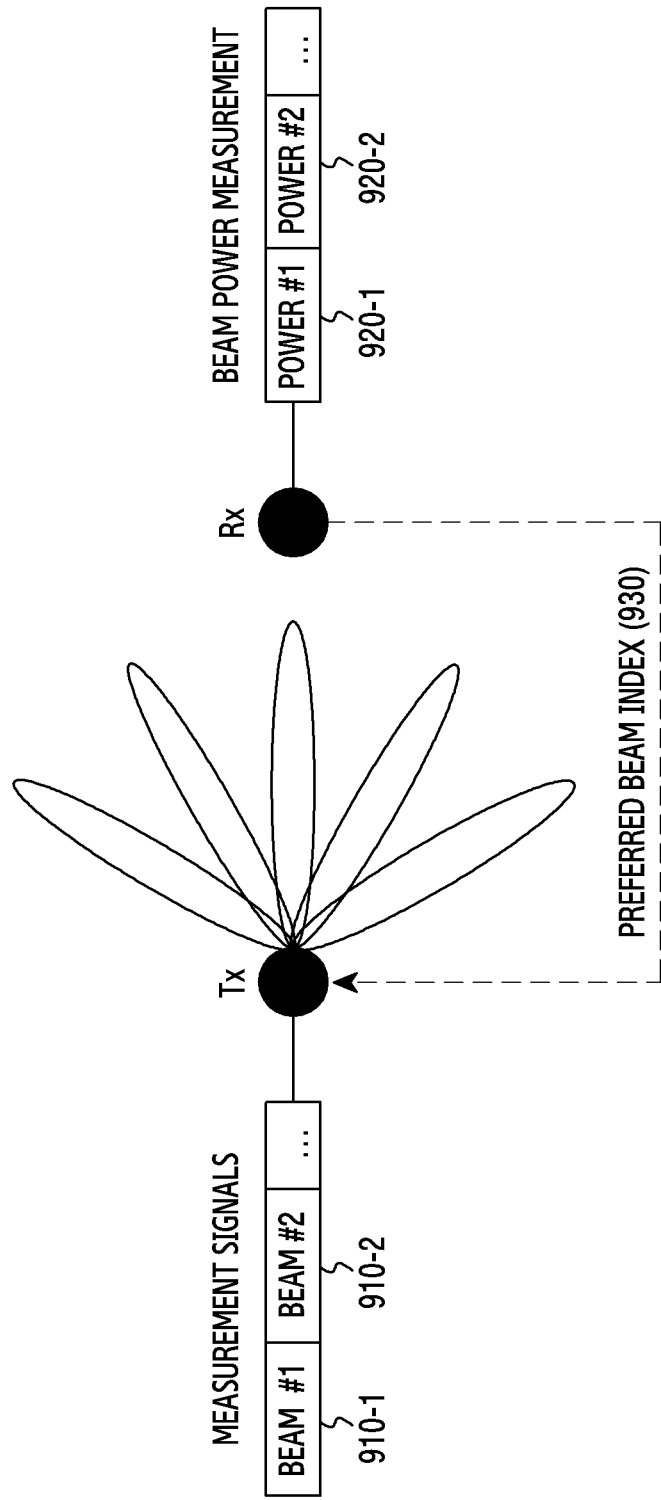
FIG. 9 illustrates a process for determining a preferred beam in a wireless communication system according to an embodiment of the disclosure.

Referring to FIG. 8, in operation 801, the base station transmits signals for measurement to the terminal. In so doing, the base station sweeps a plurality of transmit beams. Herein, the signal for the management may include one of a reference signal and a sync signal. The signal for the management may be transmitted over a predefined resource or according to control information that is transmitted to the terminal in advance. For example, as shown in FIG. 9, to apply the best analog beam between the base station and the terminal, the base station transmits power on a specific beam at a predefined time and the terminal measures the power of the corresponding beam, that is, the strength of the bream as received by the terminal. By repeating such operations on a plurality of beams 910-1 and 910-2, the terminal measures respective powers 920-1 and 920-2 of the beams.

In operation 803, the base station receives feedback information indicating a preferred beam from terminals. The feedback information includes identification information for at least one beam. Herein, the beam identification information may include information (e.g., symbol index, block index, etc.) indicating the resource that carries the signal for the measurement or information indicating the signal for the measurement. For example, as shown in FIG. 9, the terminals each may transmit a preferred beam index 930 indicating the preferred beam direction back to the base station. Additionally, the feedback information may further include channel quality information corresponding to the indicated preferred beam. Herein, the terminals may include a first terminal and a second terminal. The first terminal may indicate a first beam as the preferred beam of the first terminal, and the second terminal may indicate a second beam as the preferred beam of the second terminal.

In operation 805, the base station selects the first terminal to be allocated the preferred beam. That is, the base station determines scheduling metrics of the terminals that require data transmission, and selects the first terminal having the maximum scheduling metric. Hence, the base station allocates a resource to the first terminal, and determines to transmit a signal to the first terminal using the first beam during a time interval occupied by the allocated resource. According to an embodiment, instead of or in addition to the scheduling metric, the base station may select the first terminal based on other information (e.g., traffic characteristic, control information, etc.).

In operation 807, the base station selects the second terminal to be allocated a non-preferred beam. In other words, the base station selects the second terminal to be serviced using a second resource which is different from a first resource on the frequency axis in a time interval occupied by the first resource allocated to the first terminal. For doing so, the base station determines prioritizes based on at least one of scheduling metrics and other information (e.g., traffic characteristic, control information, etc.) of other terminals than the first terminal, and selects a terminal of the highest priority.

In operation 809, the base station determines a coding and modulation order for the first terminal and the second terminal by considering the beams to be allocated. Because the first terminal is served using the preferred beam, the base station may determine the coding and modulation order according to the channel quality of the preferred beam. Because the second terminal is served using the non-preferred beam, that is, using the preferred beam of the first terminal and not the preferred beam of the second terminal, the base station may predict an electric field reduction based on radiation patterns of the preferred beam of the second terminal and the preferred beam of the first terminal, and determine the coding and modulation order based on the predicted electric field reduction.

In operation 811, the base station transmits data to the first terminal and the second terminal using the preferred beam of the first terminal. That is, the base station transmits data destined for the first terminal over the preferred beam and data destined for the second terminal over the non-preferred beam. In other words, the base station transmits data destined for the first terminal and data destined for the second terminal over the preferred beam of the first terminal. In so doing, the resources allocated to the first terminal and the second terminal are included in the same time interval. Namely, the base station maps the data destined for the first terminal and the data destined for the second terminal to the resources of the time interval, beamforms a signal including the data, and thus transmits the signal over the first beam. Further, before transmitting the data, the base station may transmit control information (e.g., DCI) notifying the determined modulation order and code rate to the second terminal.

As stated above, the service may be provided to a terminal using the non-preferred beam that is different from a preferred beam of the terminal. In other words, if the preferred beam of each terminal is identified according to beam search or beam management, the base station allocates resources according to the priorities of the terminals. Because one analog beam is applied in one TTI, the resources may not be allocated to all of the terminals over the preferred beam. Thus, at least one terminal may be served using the non-preferred beam, to increase efficiency of resource utilization. In so doing, the terminal to serve using the non-preferred beam is selected and the terminal may be signaled regarding the use of the non-preferred beam. An embodiment for selecting the terminal to serve using the non-preferred beam is now explained by referring to FIG. 10.

Figure 10:
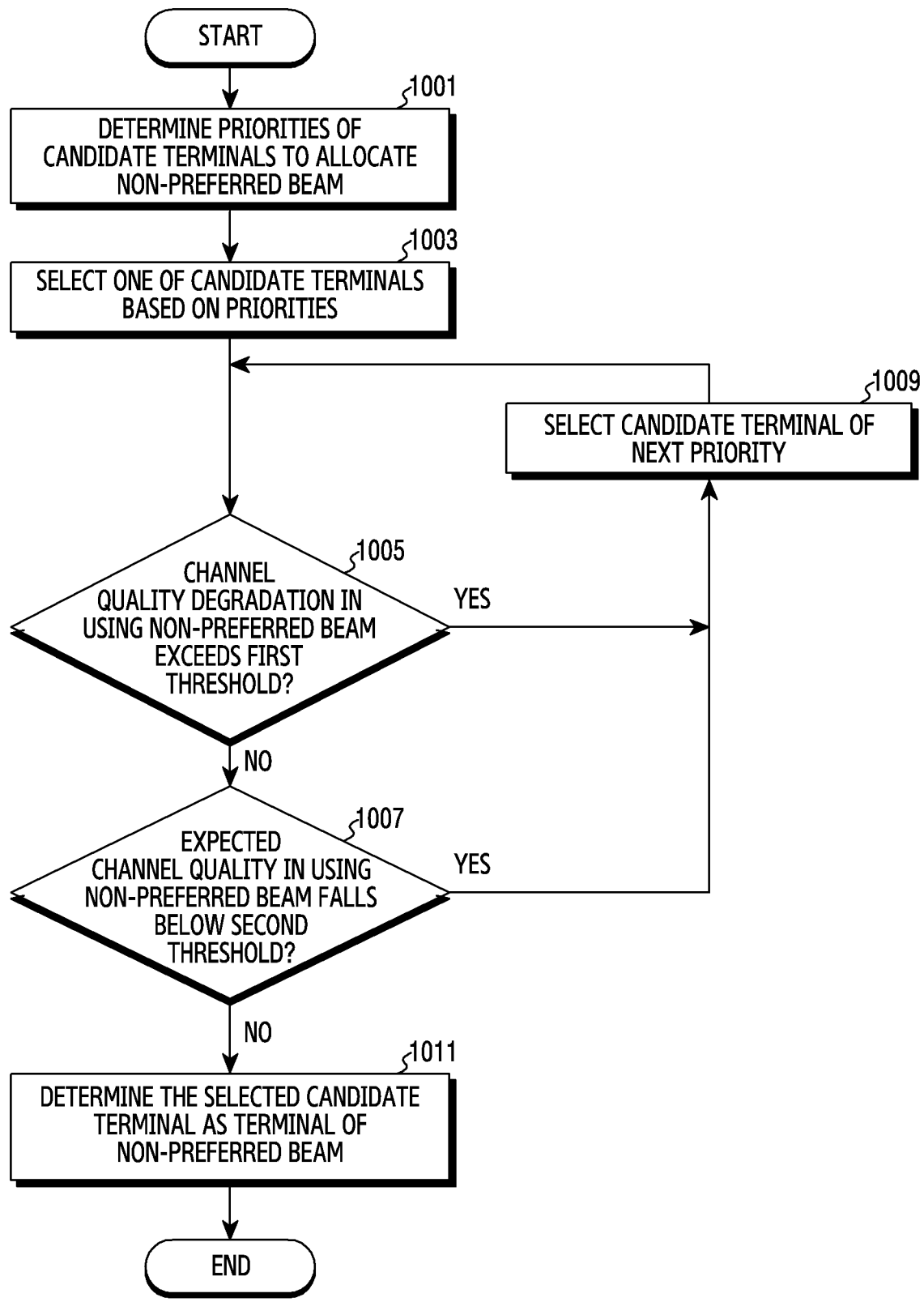
FIG. 10 illustrates a flowchart of a method for selecting a terminal served by a non-preferred beam in a wireless communication system according to an embodiment of the disclosure.

FIG. 10 illustrates a flowchart of a method for selecting a terminal served by a non-preferred beam in a wireless communication system according to an embodiment of the disclosure. FIG. 10 illustrates an operating method of the base station 110.

Referring to FIG. 10, in operation 1001, the base station determines priorities of candidate terminals to be allocated a non-preferred beam. The candidate terminals indicate terminals other than a terminal to be allocated a preferred beam among scheduling target terminals. Herein, the priority may be determined based on at least one of scheduling metrics (e.g., proportional fair (PF) metric or round robin (RR) metric) of the terminals, a user class, traffic characteristics (e.g., required latency, required data rate), transmit data type (e.g., traffic, control information, etc.), a user class, and quality of service (QoS) of flow.

In operation 1003, the base station selects one of the candidate terminals based on the priorities. That is, the base station selects one candidate terminal having the highest priority. In operation 1005, the base station determines whether channel quality degradation in using the non-preferred beam exceeds a first threshold. If the channel quality degradation does not exceed the first threshold, the base station determines whether an expected channel quality in using the non-preferred beam falls below a second threshold in operation 1007. If the channel quality degradation exceeds the first threshold or the expected channel quality falls below the second threshold, the base station selects a candidate terminal of a next priority in operation 1009. In other words, if the channel quality degradation exceeds the first threshold or the expected channel quality falls below the second threshold, the base station excludes the currently selected candidate terminal from the candidates.

If the channel quality degradation falls below the first threshold or the expected channel quality exceeds the second threshold, the base station determines the selected candidate terminal as the terminal to be allocated the non-preferred beam in operation 1011. Hence, the base station may transmit data destined for the selected candidate terminal using the non-preferred beam of the candidate terminal.

According to various embodiments as mentioned above, the terminal served using the non-preferred beam may be selected, and the resource efficiency may be enhanced. The terminal served using the non-preferred beam is determined based on the priority. According to various embodiments, the priority of the terminal may be determined based on at least one of the scheduling metric of the terminal, a service type provided to the terminal, a flow QoS, required latency, required data rate, a terminal class, and a data size to transmit (e.g., buffered data size). For example, a terminal that receives an urgent service may have a priority relatively higher than a priority of another terminal.

According to an embodiment, the terminal served using the non-preferred beam may be sequentially selected based on the priority. For example, the base station may sequentially select the candidate terminals based on the priority, and transmit data to at least one selected candidate terminal using the non-preferred beam.

According to an embodiment, the terminal served using the non-preferred beam may be selected based on channel gain decrease. For example, the base station may calculate the channel gain decrease of the candidate terminals according to the use of the non-preferred beam, select the candidate terminals in ascending order of the decrease, and transmit data to at least one selected candidate terminal using the non-preferred beam. In this case, terminals that prefer a beam of a similar direction to the used beam may be selected first.

According to an embodiment, the terminal served using the non-preferred beam may be selected based on the data rate. For example, the base station may determine the data rate based on the channel gain decrease of the candidate terminals according to the use of the non-preferred beam, select the candidate terminals in ascending order of the data rate, and transmit data to at least one selected candidate terminal using the non-preferred beam. In this case, terminals proximately close to the base station may be selected first through the terminal may prefer a different beam.

According to an embodiment, the terminal served using the non-preferred beam may be selected based on a weighted priority. For example, if the priority is determined based on the scheduling metric, the weighted priority may be defined as a product of the scheduling metric and the normalized channel gain decrease. According to an embodiment, the weight value may include various values such as data rate, in addition to or instead of the channel gain decrease.

According to an embodiment, one or more the above-stated various criteria for selecting the terminal may be applied. For example, the channel gain decrease and the data rate may be each considered when determining whether to service a terminal using a non-preferred beam. In this case, the channel gain decrease may be more heavily weighted in the determination, the data rate may be more heavily weighted in the determination, or a new metric may be used by a combination of weighting the various criteria.

In the embodiments as stated above, the base station selects the terminal served using the non-preferred beam, and determines the code rate and the modulation order. In so doing, to select the terminal served using the non-preferred beam and to determine the code rate and the modulation order, the change of the channel quality based on the use of the non-preferred beam may be estimated. In other words, the base station may expect the channel quality change if the analog beam selected by the base station is not the preferred beam of the corresponding terminal. Herein, the channel quality change may be referred to as gain change, electric field change, electric field strength change, and so on. An embodiment regarding at least part of the scheduling process in consideration of the channel quality change is explained by referring to FIG. 11.

Figure 11:
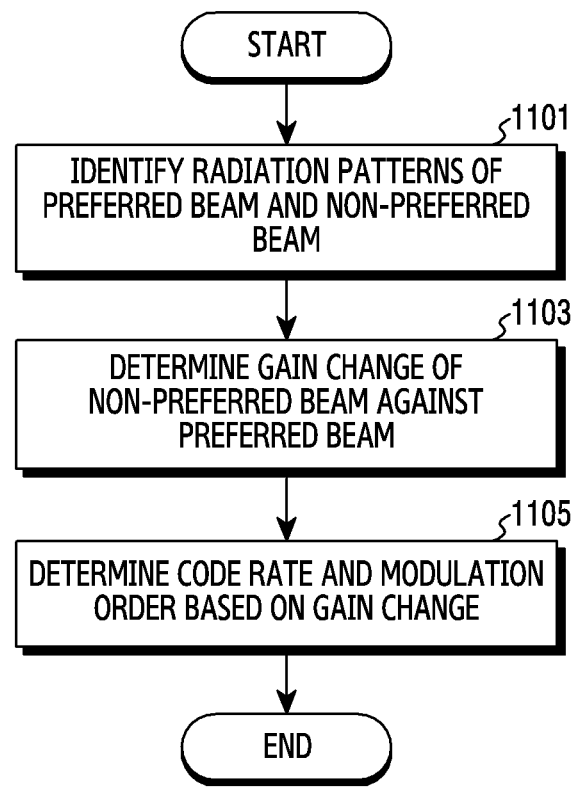
FIG. 11 illustrates a flowchart of a method for determining a code rate and a modulation order in a wireless communication system according to an embodiment of the disclosure.

FIG. 11 illustrates a flowchart of a method for determining a code rate and a modulation order in a wireless communication system according to an embodiment of the disclosure. FIG. 11 illustrates an operating method of the base station 110.

Figure 12:
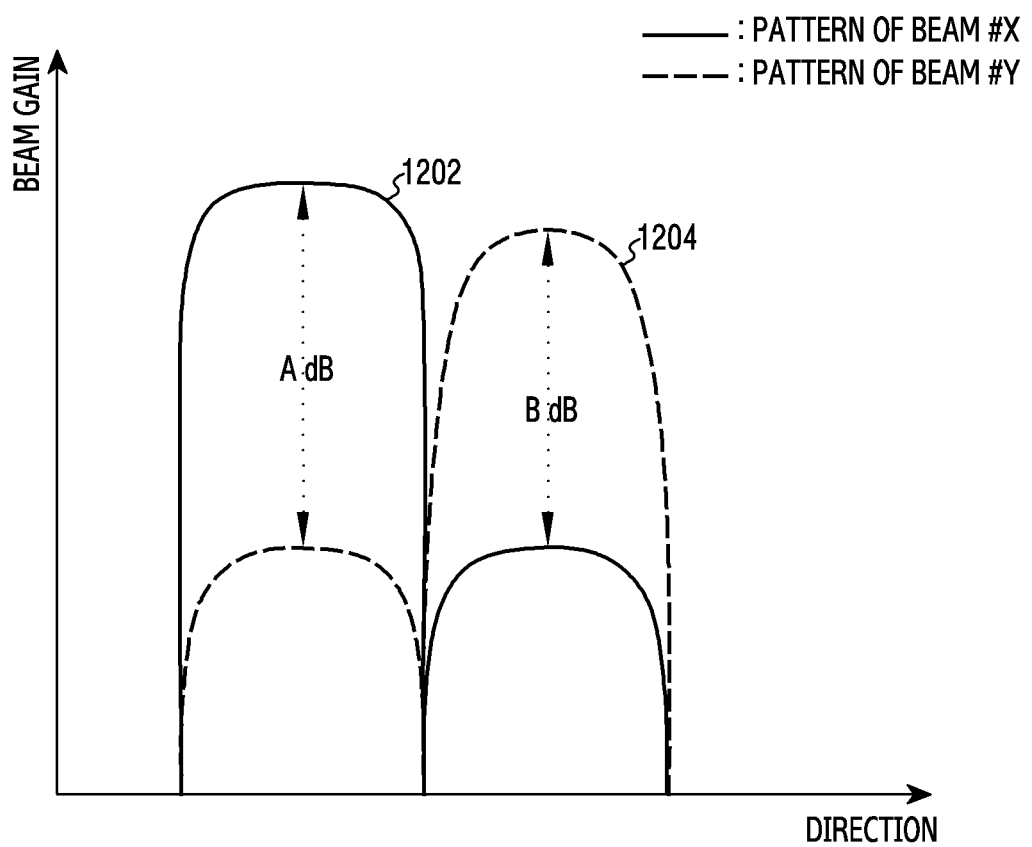
FIG. 12 illustrates gain difference based on radiation patterns of beams in a wireless communication system according to an embodiment of the disclosure.

Referring to FIG. 11, in operation 1101, the base station identifies radiation patterns of a preferred beam and a non-preferred beam. An analog beam is preset in each direction, and the base station may obtain the pattern of each beam. Hence, to transmit data to a particular terminal using the non-preferred beam, the base station may identify the radiation patterns of the preferred beam and the non-preferred beam of the particular terminal. For example, if the preferred beam is a beam # X and the non-preferred beam is a beam # Y, the base station may obtain radiation patterns 1202 and 1204 as shown in FIG. 12.

In operation 1103, the base station determines a gain change of the non-preferred beam with respect to the preferred beam. In other words, the base station identifies a difference between a gain of the preferred beam and a gain of the non-preferred beam. If using the non-preferred beam, the terminal is placed in a side lobe, rather than a main lobe. Accordingly, the base station may determine the gain change by identifying an electric field difference between the main lobe of the preferred beam and the side lobe of the non-preferred beam. For example, if the preferred beam is the beam # X and the non-preferred beam is the beam # Y in FIG. 12, the base station may determine the gain change as B dB.

In operation 1105, the base station determines a code rate and a modulation order based on the gain change. That is, the base station determines the code rate and the modulation order by considering the gain decrease in using the non-preferred beam. Hence, the base station may select more robust code rate and the modulation order than using the preferred beam. That is, the base station may apply a lower modulation and coding scheme (MCS) level than an MCS level corresponding to channel that which is received from the terminal.

In the embodiment of FIG. 11, the base station identifies the radiation patterns of the preferred beam and the non-preferred beam, and then determines the gain change. However, if a correlation of the beams, namely if a gain change information is predefined, identifying the radiation patterns may be omitted. That is, to reduce computational complexity in scheduling, the gain change information of the beams may be predetermined and then stored. In this case, operation 1103 may include retrieving a value corresponding to the two beams from the pre-stored information. For example, the gain change information of the beams may be realized as shown in Table 1.

TABLE 1

|  | beam#0 | beam#1 | beam#2 | ... | beam#N |
| --- | --- | --- | --- | --- | --- |
| beam#0 | — | A dB | B dB | ... | C dB |
| beam#1 | D dB | — | E dB | ... | F dB |
| beam#2 | G dB | H dB | — | ... | I dB |
| ... | ... | ... | ... | ... | ... |
| beam#N | J dB | K dB | L dB | ... | — |

In Table 1, the first row indicates indexes of the beams and the first column indicates indexes of preferred beams.

Figure 13:
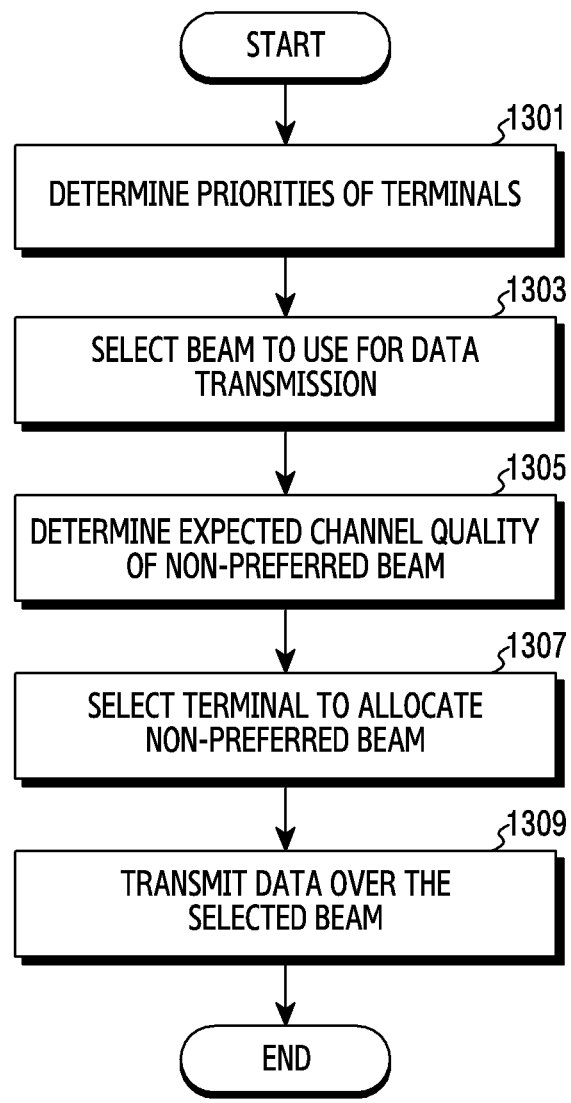
FIG. 13 illustrates a flowchart of a method for scheduling and transmitting data in a wireless communication system according to an embodiment of the disclosure.

FIG. 13 illustrates a flowchart of a method for scheduling and transmitting data in a wireless communication system according to an embodiment of the disclosure. FIG. 13 illustrates an operating method of the base station 110.

Figure 14:
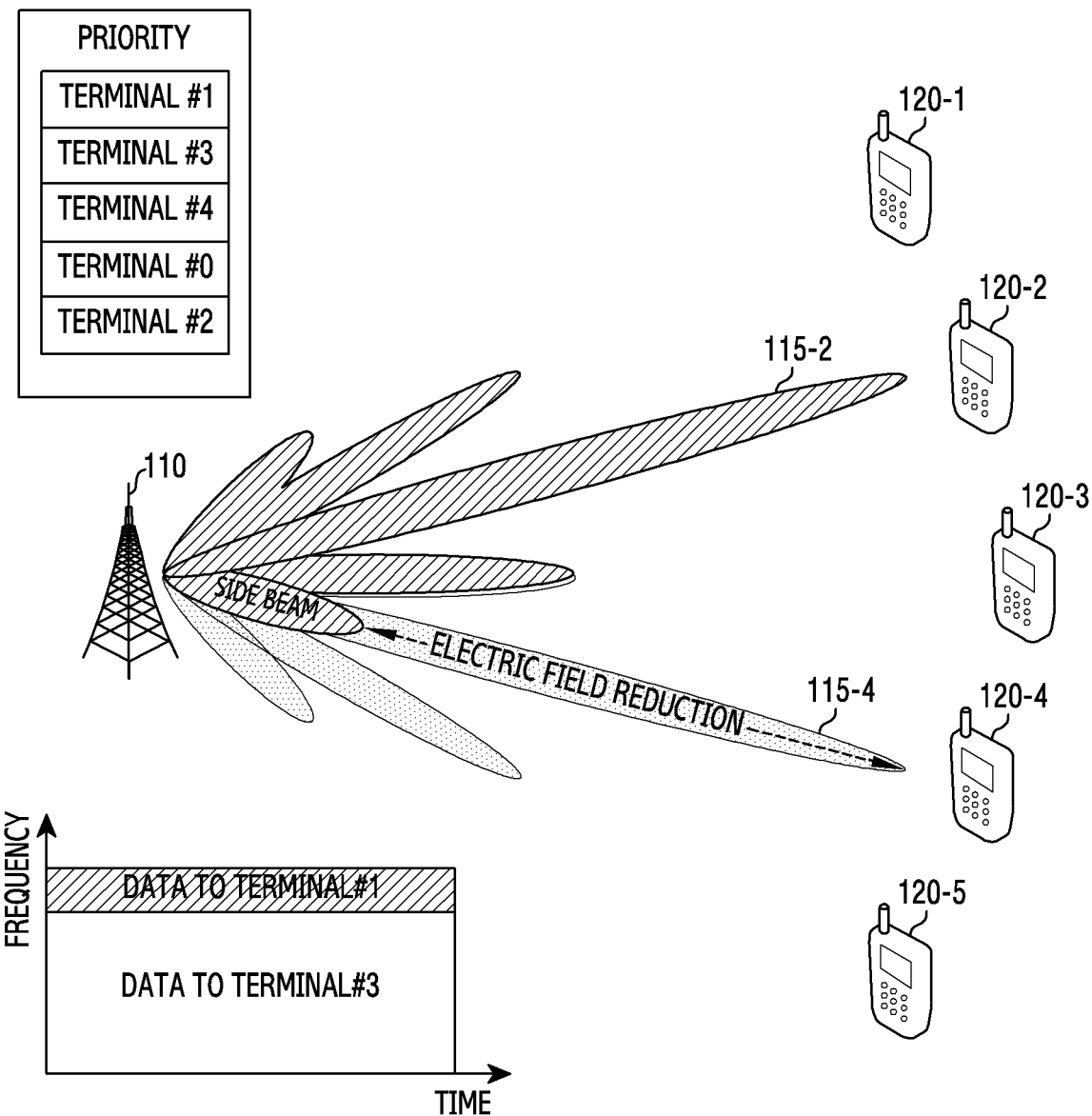
FIG. 14 illustrates data transmission using a non-preferred beam in a wireless communication system according to an embodiment of the disclosure.

Referring to FIG. 13, in operation 1301, the base station determines priorities of terminals. The base station determines the priorities of the terminals to be allocated resources in a given TTI. For example, the base station may determine the priorities based on a PF metric or an RR metric. As shown in FIG. 14, the priorities may be determined in order of terminal #1 120-2, terminal #3 120-4, terminal #4 120-5, terminal #0 120-1, and terminal #2 120-3.

In operation 1303, the base station selects a beam to use for data transmission. In other words, the base station determines which beam carries transmit data in the given TTI. In the mmWave band, because coverage limit is overcome using an analog beam, the base station determine a beam direction to use in a corresponding TTI. For example, the base station may select a preferred beam of the terminal having the highest priority. As shown in FIG. 14, the base station may select beam #1 115-2 which is a preferred beam of the terminal #1 120-2 having the highest priority.

In operation 1305, the base station determines an expected channel quality of a non-preferred beam. With respect to terminals which feed other beam than the beam selected in operation 1303, as the preferred beam, the base station determines the expected channel quality of the selected beam in operation 1303. Because channel quality information is transmitted to the base station in determining the preferred beam, the base station may obtain channel qualities of the terminals. However, because the known channel quality is based on an electric field value of the preferred beam, the channel quality may be degraded by another beam. The base station, which already knows the beam patterns, may expect the channel quality to be degraded if the beam is formed in a direction other than a direction toward a corresponding terminal. For example, to calculate the electric field reduction of the terminal #3 120-4 in using the beam #1 115-2 as shown in FIG. 14, the base station may retrieve the change corresponding to (beam #1, beam #3) from the table of Table 1.

In operation 1307, the base station selects a terminal to be allocated the non-preferred beam. For example, the base station may select the terminal to be allocated the non-preferred beam according to the priorities of the terminals. For example, if the electric field reduction due to the non-preferred beam exceeds a threshold or the expected electric field falls below a threshold, the base station may exclude a corresponding terminal from the selection. In FIG. 14, the terminal #3 120-4 is selected.

In operation 1309, the base station transmits data over the selected beam. In so doing, the data may include data destined for two or more terminals. In this case, data destined for at least one terminal may be transmitted over the preferred beam, and data destined for other terminals may be transmitted over the non-preferred beam. That is, the beam for the data transmission may be the preferred beam of at least one terminal and concurrently be the non-preferred beam of another terminal. For example, as shown in FIG. 14, data to the terminal #1 120-2 and data to the terminal #3 120-4 may be transmitted over the beam #1 115-2, which is the preferred beam of the terminal #1 120-2. At this time, the terminal #3 120-4, which is positioned in a substantially similar direction of the beam #1 115-2, may be subject to the electric field reduction, compared with the preferred beam.

As stated in FIG. 13 and FIG. 14, the base station may expect the channel quality or the electric field according to the use of the non-preferred beam. According to an embodiment, the expected channel quality may be determined based on electric field change information known by the base station, as expressed in Equation 1.

$$SINR_E = SINR(I_{PB}) - T(I_{PB}, I_{UB}) \quad (1)$$

In Equation 1, $SINR_E$ denotes the expected channel quality, $SINR(k)$ denotes a channel quality at a main lobe of a beam having an index k, $I_{PB}$ denotes an index of the preferred beam, $T(m,n)$ denotes the electric field reduction if a beam # m is used to transmit data to a terminal which prefers a beam # n, and $I_{UB}$ denotes an index of the beam being used. While the channel quality is represented as, but not limited to, signal to interference and noise ratio (SINR) in Equation 1, other measures such as signal to noise ratio (SNR), carrier to interference and noise ratio (CINR), and received signal strength indicator (RSSI) may be applied.

According to an embodiment, the expected channel quality may be determined based on Equation 2. Equation 2 suggests a more conservative criterion than Equation 1.

$$\text{SINR}_E = \text{SINR}(I_{PB}) - T(I_{PB}, I_{UB}) - M \qquad (2)$$

In Equation 2, $\text{SINR}_E$, denotes the expected channel quality, SINR(k) denotes the channel quality at the main lobe of the beam having the index k, $I_{PB}$ denotes the index of the preferred beam, T(m,n) denotes the electric field reduction if the beam # m is used to transmit data to the terminal which prefers the beam # n, $I_{UB}$ denotes the index of the beam being used, and M denotes a margin. While the channel quality is represented as, but not limited to, the SINR in Equation 2, other measures such as SNR, CINR, and RSSI may be applied.

According to an embodiment, the channel quality in using the non-preferred beam may be measured. For example, the base station may transmit a signal for measurement using the non-preferred beam to be used for the data transmission, and receive from the terminal a feedback message that includes data indicating the channel quality. In this case, the base station may obtain more accurate channel quality than the predictive method. For example, for the measurement, beam refinement reference signal (BRRS) or channel state information (CSI)-reference signal (RS) may be used. In this case, before the signal transmission for the measurement, the base station may transmit signal configuration information for the measurement to the terminal. For example, the signal configuration information for the measurement may designate at least one of a resource carrying the signal, a signal sequence, a feedback type, and a feedback resource.

Figure 15:
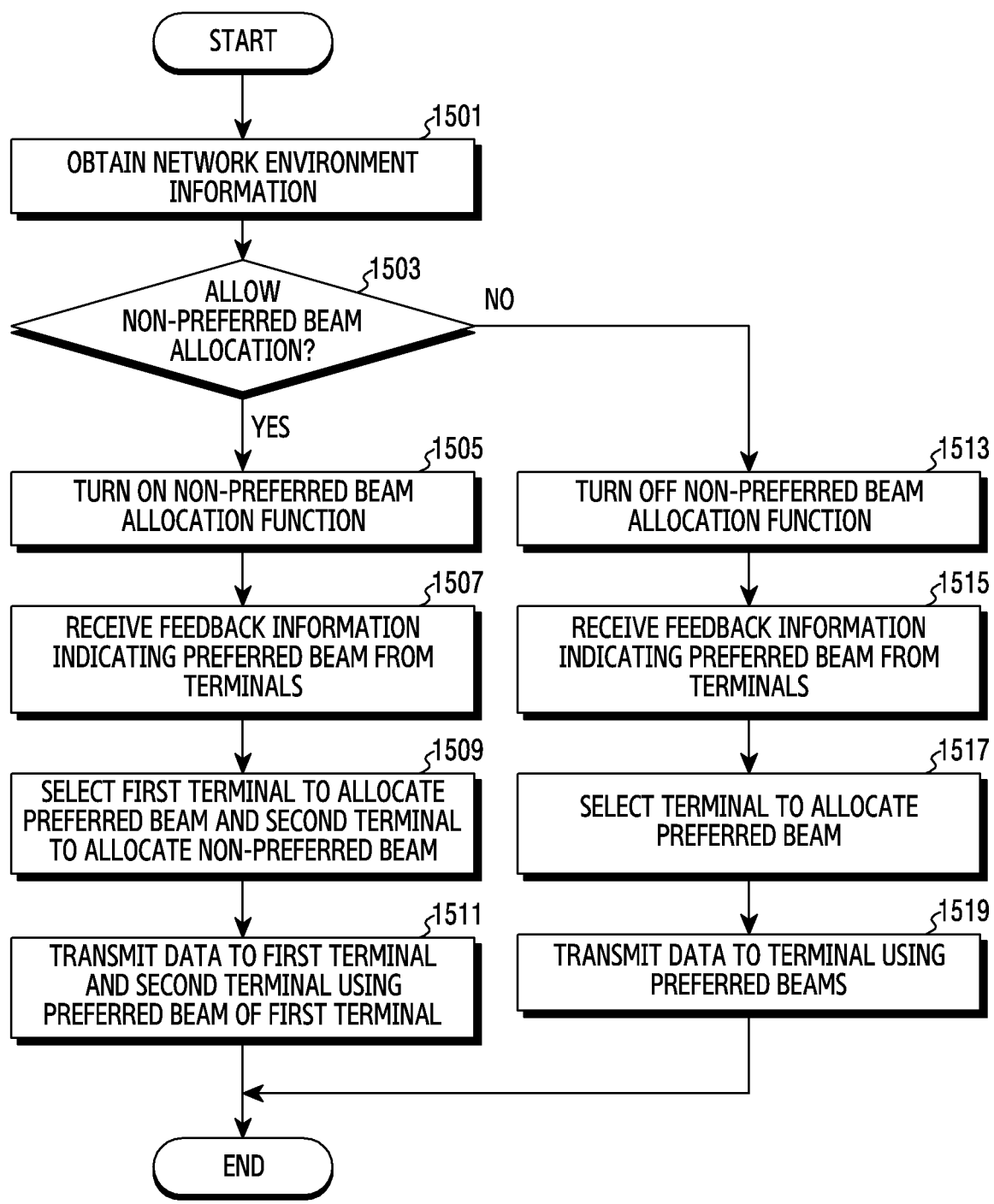
FIG. 15 illustrates a flowchart of a method for determining a policy for a non-preferred beam in a wireless communication system according to an embodiment of the disclosure.

FIG. 15 illustrates a flowchart of a method for determining a policy for a non-preferred beam in a wireless communication system according to various embodiments of the disclosure. FIG. 15 illustrates an operating method of the base station 110.

Referring to FIG. 15, in operation 1501, the base station obtains network environment information. The network environment information is required to determine whether to permit allocation of a non-preferred beam. For example, the network environment information may include at least one of beam sharpness, the number of active terminals, a traffic volume, and a load level.

In operation 1503, the base station determines whether to permit the non-preferred beam allocation. The base station determines whether to permit the non-preferred beam allocation based on the network environment information obtained in operation 1501. According to an embodiment, the base station may determine whether to allow the non-preferred beam allocation by considering computational complexity, which increases according to the non-preferred beam allocation, a throughput gain achieved by the non-preferred beam allocation, and an efficiency level of a required resource.

If determining to allow the non-preferred beam allocation (operation 1503—YES), the base station turns on a non-preferred beam allocation function in operation 1505. Hence, the base station may transmit data using the non-preferred beam according to various embodiments.

In operation 1507, the base station receives feedback information indicating a preferred beam from terminals. For doing so, the base station may transmit measurement signals (e.g., reference signal, sync signal). The feedback information may include information indicating the preferred beam and information notifying a channel quality corresponding to the preferred beam.

In operation 1509, the base station selects a first terminal to be allocated the preferred beam and a second terminal to be allocated the non-preferred beam. For doing so, the base station selects the first terminal and then selects the second terminal from among candidate terminals, based on priority. In so doing, to determine the priority, at least one of a scheduling metric, a service type, a flow QoS, a required latency, a required data rate, a terminal class, a transmit data size, a channel gain reduction, and an expected data rate may be used.

In operation 1511, the base station transmits data to the first terminal and the second terminal using the preferred beam of the first terminal. The base station may apply a code rate and a modulation order corresponding to the preferred beam, to the data destined for the first terminal, and apply a code rate and a modulation order determined based on radiation patterns of the preferred beam and the non-preferred beam, to the data destined for the second terminal.

If not permitting the allocation of the non-preferred beam (operation 1503—NO), the base station turns off the non-preferred beam allocation function in operation 1513. In operation 1515, the base station receives feedback information indicating the preferred beam from terminals. In operation 1517, the base station selects a terminal to be allocated the preferred beam. That is, the base station may not select the terminal to be allocated the non-preferred beam. In operation 1519, the base station transmits data to the terminal using the preferred beams of the terminals.

According to the embodiment as described in FIG. 15, the base station may control the non-preferred beam allocation function according to the network environment. In so doing, the non-preferred beam allocation function may be controlled based on at least one of beam sharpness, the number of active terminals, a traffic volume, and a load level. Herein, the active terminal is a terminal connected to a corresponding base station and may be able to transmit and receive data (e.g., active state). In general, as the beam sharpness increases, the number of active terminals decreases, and the traffic volume decreases, performance improvement according to the non-preferred beam allocation may grow. Hence, the non-preferred beam allocation function may be controlled to operate only in an environment in which a considerable performance improvement gain is expected.

Specifically, the non-preferred beam allocation function may be deactivated if at least one of conditions arranged in Table 2 is satisfied.

TABLE 2

| Condition | Control |
| --- | --- |
| A width of a beam used for data transmission being less than a threshold | non-preferred beam allocation function is off |
| The number of active terminals being greater than a threshold | non-preferred beam allocation function is off |
| Traffic load on cell being greater than a threshold | non-preferred beam allocation function is off |
| A ratio of the number of active terminals and a beam width being greater than a threshold. | non-preferred beam allocation function is off |

To control the non-preferred beam allocation function, any one of the conditions of Table 2 may be used or a combination of two or more conditions may be used. To control the non-preferred beam allocation function, conditions other than the conditions of Table 2 may be used.

The entity of the operations according to the embodiment of FIG. 15 is the base station. However, according to an embodiment, the operations of FIG. 15 may be fulfilled by a network entity other than the base station. In this case, the base station may provide network environment information to the other network entity, and the other network entity may perform at least part of the operations of FIG. 15 based on network environment information gathered from one or more base stations.

According to embodiments described above, the non-preferred beam may be used to transmit signals. While it has been assumed that a plurality of analog beams is not formed on the frequency axis, various embodiments of the disclosure may be implemented regardless of the analog beam forming capability of a transmitting stage (e.g., a base station). In other words, even though a plurality of different beams may be formed on the frequency axis, the transmitting stage may allocate the non-preferred beam. For example, the aforementioned various embodiments may be carried out if the base station deactivates some of the antenna arrays (e.g., to reduce power consumption) or if multiple antenna arrays are used but only one beam is used in one time interval (e.g., to reduce computations).

In the system operating in the 5G mmWave band, the use of 256 or more antenna elements is considered and accordingly a beamwidth of each beam is very small. In this case, it is not easy to always expect a plurality of terminals in each beam direction. Thus, if resources are allocated only to a terminal positioned in the selected beam direction, great restrictions may be imposed on the base station scheduling. The scheduling method according to various embodiments may improve system performance by controlling the resource waste due to a directional antenna which is used in the mmWave band.

As set forth above, an apparatus and a method according to various embodiments of the disclosure may reduce the wasted resources, by using the non-preferred beam.

The methods according to the embodiments described in the claims or the specification of the disclosure may be implemented in software, hardware, or a combination of hardware and software.

As for software, a computer-readable storage medium storing the computer-readable and executable one or more programs (software modules) may be provided. One or more programs stored in the computer-readable storage medium may be configured for execution by one or more processors of an electronic device. One or more programs may include computer-readable instructions for controlling the electronic device to execute the methods according to the embodiments described in the claims or the specification of the disclosure.

Such a program (software module, software) may be loaded to or stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network such as Internet, Intranet, local area network (LAN), wide LAN (WLAN), or storage area network (SAN), or a communication network by combining these networks. The storage device may access the electronic device through an external communication interface. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating a base station in a wireless communication system, the method comprising:
   receiving first feedback information indicating a first preferred beam from a first terminal and second feedback information indicating a second preferred beam from a second terminal;
   allocating to both the first terminal and the second terminal the first preferred beam as a beam for data transmission;
   identifying a modulation and coding scheme (MCS) level for data transmission to the second terminal based on a gain difference between the first preferred beam and the second preferred beam; and
   while transmitting first data to the first terminal using the first preferred beam in a designated time interval, transmitting second data to the second terminal using the first preferred beam in the designated time interval based on the identified MCS level.

2. The method of claim 1, wherein allocating comprises:
   identifying priorities of the first terminal and the second terminal;
   selecting the first preferred beam as the beam for data transmission during the designated time interval, based on the priorities;
   identifying the gain difference between the first preferred beam and the second preferred beam; and
   identifying whether to transmit the second data to the second terminal using the first preferred beam, based on the gain difference.

3. The method of claim 2, further comprising:
   when the gain difference is lower than a threshold value, identifying to transmit data to the second terminal using the first preferred beam.

4. The method of claim 2, wherein identifying whether to transmit the data further comprises:
   identifying an expected electric field reduction when the second data is transmitted using the first preferred beam instead of the second preferred beam; and
   based on the electric field reduction, identifying whether to transmit the second data to the second terminal using the first preferred beam.

5. The method of claim 4, wherein identifying whether to transmit the data further comprises:
   identifying an expected channel quality of the second terminal based on the electric field reduction; and
   identifying whether to transmit the second data to the second terminal using the first preferred beam, based on the expected channel quality.

6. The method of claim 2, wherein the priorities are identified based on at least one of scheduling order, a user class, traffic characteristics, transmit data type, or quality of service (QoS) of the first terminal and the second terminal.

7. The method of claim 1, further comprising:
   transmitting, to the second terminal, control information for notifying the identified MCS level.

8. The method of claim 1, wherein the identified MCS level is lower than an MCS level corresponding to the second preferred beam.

9. The method of claim 1, further comprising:
identifying whether to allocate the first preferred beam to the second terminal, based on network environment information,
wherein the network environment information comprises at least one of beam sharpness, a number of active terminals, a traffic volume, or a load level.

10. A base station in a wireless communication system, the base station comprising:
a transceiver configured to transmit signals to and receive signals from a first terminal and a second terminal; and
at least one processor configured to:
receive via the transceiver from the first terminal first feedback information indicating a first preferred beam and via the transceiver from a second terminal second feedback information indicating a second preferred beam,
allocate to both the first terminal and the second terminal the first preferred beam as a beam for data transmission,
identify a modulation and coding scheme (MCS) level for data transmission to the second terminal based on a gain difference between the first preferred beam and the second preferred beam, and
control the transceiver to transmit, while first data is transmitted to the first terminal using the first preferred beam in a designated time interval, second data to the second terminal using the first preferred beam in the designated time interval based on the identified MCS level.

11. The base station of claim 10, wherein the at least one processor is configured to
identify priorities of the first terminal and the second terminal;
select the first preferred beam as the beam for data transmission during the designated time interval, based on the priorities;
identify the gain difference between the first preferred beam and the second preferred beam; and
identify whether to transmit the second data to the second terminal using the first preferred beam, based on the gain difference.

12. The base station of claim 11, wherein the at least one processor is further configured to:
when the gain difference is lower than a threshold value, identify to transmit data to the second terminal using the first preferred beam.

13. The base station of claim 11, wherein the at least one processor is further configured to:
identify an expected electric field reduction when the second data is transmitted using the first preferred beam instead of the second preferred beam; and
based on the electric field reduction, identify whether to transmit the second data to the second terminal using the first preferred beam.

14. The base station of claim 13, wherein the at least one processor is configured to:
identify an expected channel quality of the second terminal based on the electric field reduction; and
identify whether to transmit the second data to the second terminal using the first preferred beam, based on the expected channel quality.

15. The base station of claim 10, wherein the at least one processor is configured to identify the priorities based on at least one of scheduling order, a user class, traffic characteristics, transmit data type, or quality of service (QoS) of the first terminal and the second terminal.

16. The base station of claim 10, wherein the at least one processor is further configured to:
transmit, to the second terminal, control information for notifying the identified MCS level.

17. The base station of claim 10, wherein the identified MCS level is lower than an MCS level corresponding to the second preferred beam.

18. The base station of claim 10, wherein the at least one processor is further configured to:
identify whether to allocate the first preferred beam to the second terminal, based on network environment information,
wherein the network environment information comprises at least one of beam sharpness, a number of active terminals, a traffic volume, or a load level.

19. A terminal in a wireless communication system, the terminal comprising:
a transceiver; and
at least one processor configured to:
transmit via the transceiver to a base station feedback information indicating a first beam as a preferred beam, and
receive data transmitted using a second beam that is another preferred beam of another terminal, and different from the first beam,
wherein the received data is generated at the base station based on a modulation and coding scheme (MCS) level for data transmission to the other terminal based on a gain difference between the preferred beam and the other preferred beam, and
wherein the received data is transmitted during a designated time interval during which another data for the other terminal is transmitted.

20. The terminal of claim 19, wherein priority of the terminal identified by the base station is lower than priority of the other terminal identified by the base station.

* * * * *